(12) United States Patent
Shen

(10) Patent No.: US 9,976,629 B2
(45) Date of Patent: May 22, 2018

(54) MAGNETO-RHEOLOGICAL SERVO SPEED REGULATING AND REDUCING DEVICE AND ASSEMBLY AND CONTROL METHOD THEREFOR

(71) Applicant: NOVITRANS AUTOMATIC CO., LTD., Shanghai (CN)

(72) Inventor: Xihe Shen, Shanghai (CN)

(73) Assignee: LANGHAM AUTOMATIC CO., LTD., Shanghai (CN)

( * ) Notice: Subject to any disclaimer, the term of this patent is extended or adjusted under 35 U.S.C. 154(b) by 84 days.

(21) Appl. No.: 15/112,404

(22) PCT Filed: Apr. 22, 2014

(86) PCT No.: PCT/CN2014/075895
§ 371 (c)(1),
(2) Date: Jul. 18, 2016

(87) PCT Pub. No.: WO2015/161430
PCT Pub. Date: Oct. 29, 2015

(65) Prior Publication Data
US 2016/0333965 A1  Nov. 17, 2016

(51) Int. Cl.
| | | |
|---|---|---|
| F16H 57/08 | (2006.01) | |
| F16H 1/32 | (2006.01) | |
| F16H 37/08 | (2006.01) | |
| F16D 37/00 | (2006.01) | |
| F16D 37/02 | (2006.01) | |

(52) U.S. Cl.
CPC ........... *F16H 1/32* (2013.01); *F16H 37/0833* (2013.01); *F16H 57/08* (2013.01); *F16D 37/008* (2013.01); *F16D 37/02* (2013.01); *F16H 2001/323* (2013.01); *F16H 2001/325* (2013.01); *F16H 2057/087* (2013.01)

(58) Field of Classification Search
None
See application file for complete search history.

(56) References Cited

U.S. PATENT DOCUMENTS

| | | | | |
|---|---|---|---|---|
| 2011/0037306 A1* | 2/2011 | Schuler | ............... | B60N 2/0232 297/353 |
| 2011/0082000 A1* | 4/2011 | Makino | .................... | B60K 1/00 475/149 |
| 2013/0009450 A1* | 1/2013 | Suzuki | ................ | B60K 7/0007 301/6.5 |

(Continued)

*Primary Examiner* — Justin Holmes
(74) *Attorney, Agent, or Firm* — CBM Patent Consulting, LLC

(57) ABSTRACT

A magneto-rheological servo speed regulator-reducer comprises a power output shaft, a planetary gear (2), an eccentric shaft (3), a left speed reduction main shaft (4), a pin gear housing (5), a cycloidal pin (6), a main bearing (7), a right speed reduction main shaft (8), a signal control line (9), a base housing (10), a clutch end plate (11), a coil iron core (12), an excitation coil (13), an input shaft bracket (14), an input bearing (15), a power input shaft (16), an input shaft oil seal (17), magneto-rheological fluid (18), a transmission clutch disc (19), a clutch cavity (20), a transmission oil seal (21), a clutch oil seal (22), an encoder (23), a transmission bearing (24), a cycloidal gear bearing (25), a cycloidal gear (26), a speed reduction main shaft oil seal (27), an eccentric bearing (28) and a transmission main shaft (29).

8 Claims, 5 Drawing Sheets

(56) References Cited

U.S. PATENT DOCUMENTS

2013/0119748 A1* 5/2013 Yamamoto ........... B60K 7/0007
  301/6.5
2013/0307320 A1* 11/2013 Akamatsu ........... B60L 15/2054
  301/6.5

* cited by examiner

MAGNETO-RHEOLOGICAL SERVO SPEED REGULATING AND REDUCING DEVICE AND ASSEMBLY AND CONTROL METHOD THEREFOR

This application is the U.S. national phase of International Application No. PCT/CN2014/075895 Filed on 22 Apr. 2014 which designated the U.S., the entire contents of each of which are hereby incorporated by reference.

TECHNICAL FIELD

The present invention relates to a precise transmission device suitable for power transmission of a variety of motors and engines as well as speed regulation and reduction and mechatronics. The device is able to be widely applied in industry, agriculture, mine, port and other industries as well as for military and civil use, and in particular, for a magneto-rheological servo speed regulator-reducer and an assembly and control method thereof in key application technology field of a variety of smart devices and industrial robots.

BACKGROUND ART

The function of traditional electronic speed regulator and mechanical speed reducer can only be used alone, so that electromechanical linkage control cannot be realized. The traditional electronic speed regulator only regulates the speed of power source. The power has damping difference in the process of transmission. The stability problem of load real-time operation cannot be directly solved by the electronic speed regulator. The traditional mechanical speed reducer has single function and cannot randomly control and regulate speed ratio when used, so that the use function of the product is limited greatly. The existing precise speed reducer for intelligent devices and supporting for servo motors has higher requirement for product design, material and technology and very high market application cost, so as to go against popularization and promotion. Additionally, the production technology in developed countries has become mature so far, and it is very difficult to break through the technical level of the original product except for innovative design ideas. Due to the limit of the traditional transmission technology, the product like intelligent precise speed regulator-reducer capable of realizing the mechatronic function has not been discovered yet in the current global market of power transmission and control technology.

Magneto-rheological fluid made of a novel phase change material is magnetic particle suspension fluid mixed with minute (micron- or even nanometer-level) soft magnetic particles with high permeability and low magnetic retardation. Suspended iron particles freely move along with the fluid in the absence of magnetic field, but these suspended iron particles are mutually attracted in the presence of magnetic field to form a cluster of chain structures from one pole of the magnetic field to the other pole thereof. At this time, the magneto-rheological fluid is turned into a plastic body or a viscoelastic body with a certain yield shear stress at the moment of millisecond. When the current in the a magnetic field coil is changed to obtain the magnetic field with different strength, the yield shear stress of the magneto-rheological fluid is also changed, that is to say, an anti-shearing force is very high under the action of the strong magnetic field to show the fluid feature of high viscosity and low fluidity. The feature of low viscosity is shown under the condition of zero magnetic field, and the shearing yield strength and the magnetic field strength (or current strength) have a stable corresponding relation. The continuous variability of the damping force can be realized due to such rheology controllability of the magneto-rheological fluid so as to achieve the active control on clutch brake of the power transmission.

SUMMARY OF THE INVENTION

The object of the invention is to provide a magneto-rheological servo speed regulator-reducer and an assembly and control method thereof in response to the technical problem that the electromechanical linkage control cannot be realized by the traditional electronic speed reducer and mechanical speed reducer. The power transmission control technology is subject to integrated innovation and design by adopting new material of flexible transmission, new technology servo speed regulation and mechatronic product in combination with technical problems of promoting technology upgrading, simplifying production process, reducing product cost, improving enterprise efficiency and broadening market application, etc.

In order to achieve the above object, a magneto-rheological servo speed regulator-reducer is designed and includes a power output shaft, a planetary gear, an eccentric shaft, a left speed reduction main shaft, a pin gear housing, a cycloidal pin, a main bearing, a right speed reduction main shaft, a signal control line, a base housing, a clutch end plate, a coil iron core, an excitation coil, an input shaft bracket, an input bearing, a power input shaft, an input shaft oil seal, magneto-rheological fluid, a transmission clutch disc, a clutch cavity, a transmission oil seal, a clutch oil seal, an encoder, a transmission bearing, a cycloidal gear bearing, a cycloidal gear, a speed reduction main shaft oil seal, an eccentric bearing and a transmission main shaft, wherein both sides of the main bearing are connected with the left speed reduction main shaft and the right speed reduction main shaft, the transmission main shaft is inserted into a right speed reduction main shaft hole, the transmission bearing is installed on the main bearing to form a transmission shaft component, one end at the left side of the transmission main shaft is connected with the planetary gear, the planetary gear is connected with the eccentric shaft to form a planetary speed reducer part with the transmission shaft component, the eccentric bearing and the cycloidal gear bearing are arranged on the eccentric shaft, the cycloidal gear is arranged on the cycloidal gear bearing, the outside of the cycloidal gear is provided with the cycloidal pin, the cycloidal pin, the main bearing, the left speed reduction main shaft, the right speed reduction main shaft, the eccentric shaft, the cycloidal gear bearing, the cycloidal gear and the eccentric bearing constitute a cycloidal pin gear speed reducer part, the power output shaft is installed on the left speed reduction main shaft to constitute a double speed reduction mechanism with the cycloidal pin gear speed reducer part and the planetary speed reducer part, the encoder is sheathed on the right speed reduction main shaft and accessed into the signal control line to form a signal source component, the transmission main shaft is connected with the power input shaft via a magneto-rheological clutch transmission mechanism, the left side of the transmission clutch disc is provided with the transmission main shaft, the right side of the transmission clutch disc is provided with the power input shaft, the transmission clutch disc is arranged in the clutch cavity, the outside of the clutch cavity is provided with the coil iron core, the coil iron core is twined with excitation coil, and the magneto-rheological fluid is provided in the clutch cavity.

The anti-shearing force of the magneto-rheological fluid is very high under the action of a strong magnetic field of the coil, the yield strength and magnetic field strength have a stable corresponding relation, the controllability of the magneto-rheological fluid is applied, a servo system is configured to realize the clutch force regulation and the torque control in order to achieve the transmission control commonly used in a large-scale power application occasion, wherein a speed reduction function part uses the double speed reduction mechanism with the planetary gear and a cycloidal pin gear and is connected with a driving shaft of a planetary speed reduction mechanism via the clutch transmission mechanism, the planetary gear of the planetary speed reduction mechanism is connected with the eccentric shaft of the cycloidal pin gear speed reduction mechanism, and the power output shaft can provide a large speed ratio and output torque.

Servo function part in the servo system uses an encoder mechanism and an external controller, the clutch transmission mechanism automatically regulates the current of the excitation coil and the magnetic field strength of the iron core by setting a control system and processing the information of the encoder so as to realize the flexible power clutch of the servo speed regulator-reducer, the precisely random speed regulation and closed-and-open loop control.

The excitation coil is accessed into the signal control line and the coil iron core to constitute an electromagnetic control component, and the signal control line is connected to a servo controller.

A transmission way is as follows: transmitting from the power output shaft and the transmission clutch disc of the magneto-rheological clutch part to the transmission main shaft and the planetary gear of the planetary speed reducer part, and then transmitting to the eccentric shaft, the cycloidal gear, the left speed reduction main shaft, the right speed reduction main shaft of the cycloidal pin gear speed reducer part and finally to the power output shaft.

The encoder is sheathed on the right speed reduction main shaft to gather and feed back the information of the power output shaft and a load end, and the external servo controller drives the excitation coil and the coil iron core to produce a rotating magnetic field.

An assembly method of the magneto-rheological servo speed regulator-reducer includes the specifically following steps of:

a. installing the eccentric shaft, the cycloidal gear bearing, the cycloidal gear and the eccentric bearing to form an eccentric shaft component;

b. installing the pin gear housing, the cycloidal pin, the main bearing, the speed reduction main shaft oil seal, the left speed reduction main shaft, the right speed reduction main shaft and the eccentric shaft component to constitute the cycloidal pin gear speed reducer part;

c. inserting the transmission main shaft into the right speed reduction main shaft, and positioning and installing the transmission bearing to form the transmission shaft component;

d. installing the planetary gear on the eccentric shaft to form the planetary speed reducer part with the transmission shaft component;

e. installing the power output shaft on the left speed reducer main shaft to constitute a double speed reduction mechanism with the cycloidal pin gear speed reducer part and the planetary speed reducer part;

f. sheathing the encoder on the right speed reduction main shaft, and accessing the signal control line to constitute the signal source component;

g. installing the clutch end plate, the input bearing, the power input shaft, the input shaft oil seal and the transmission;

h. using the clutch disc, the clutch cavity, the transmission oil seal and the clutch oil seal to constitute a clutch component;

i. injecting the magneto-rheological fluid into the clutch component cavity to constitute a magneto-rheological clutch part;

j. accessing the excitation coil into the signal control line and installing in the pin gear housing with the coil iron coil to constitute the electromagnetic control component;

k. sheathing the input shaft bracket on the input bearing and the base housing to constitute a clutch speed regulation mechanism;

l. installing the mechanisms, parts and components to complete the assembly of the speed regulator-reducer; and m. connecting the signal control line to the servo controller to complete the final assembly of the magneto-rheological servo speed regulator-reducer.

A control method of the magneto-rheological servo speed regulator-reducer includes the following steps of: switching on the power, enabling an electric motor and the servo controller to enter into a standby state, setting up running mode, time, pulse number, cycle number and other parameters on a controller panel, starting a power motor by the servo controller to run, wherein a clutch coil of the speed reducer is still in a power-losing state, starting a servo control system procedure, driving the controller to output current to the clutch coil, enabling the magneto-rheological fluid to change phase, enabling the clutch disc to engage with power, driving a speed reducer output shaft to run, setting up or regulating the value of the clutch coil current on the controller panel, regulating the speed by the speed reducer, running the output shaft to enable the encoder to produce a feedback pulse signal, starting pulse counting from zero by the system procedure, controlling the clutch coil for power losing by the system procedure when obtaining that the position pulse number is equal to the feedback pulse number of a transducer by comparing circuits, stopping the speed reducer output shaft, driving a switch contact of the controller circuit to reset, enabling the electric motor to lose power and stop running, commanding the servo controller and the motor to return to the initial standby state by the control procedure according to the set time, switching off a circuit break to cut off the power and the control power source;

The specific control method is as follows:

(1) time control mode switching on an electric main loop, feeding by a direct current power source to, starting the system, closing a normally open contact of a relay, starting a dynamical power to enable the electric motor to run; driving the clutch coil current by the control system according to the running time value set by a single chip and the speed current value of the output shaft, closing the clutch, and enabling the output shaft to output the power; when running to the set time value, enabling the clutch coil to lose power, separating the clutch, resetting the normally open contact of the relay at this moment, cutting off the electric motor driving power to end the power output;

(2) position control mode switching on an electric main loop, feeding by a direct current power source to, starting the system, closing a normally open contact of a relay, starting a dynamical power to enable the electric motor to run; driving the clutch coil current by the control system according to the pulse numerical value set by a single chip and the speed current value of the output shaft, closing the clutch, and enabling the output shaft to output the power; comparing the set pulse number with the feedback pulse number by the control system, when the feedback pulse counting number is equal to the set pulse numerical value, enabling the clutch coil to lose power, separating the clutch, resetting the normally open contact of the relay at this moment, cutting off the electric motor driving power to end the power output;

(3) cycle control mode

At the premise of setting the interval time and period time, the controller continuously recycles a process of a power output working period by, i.e., starting and running——resetting and stopping——time interval——starting and running.

Compared with the prior art, the present invention has the advantages as follows:

1. Compared with a power transmission mode combined by the mechanical speed reducer and the servo motor, the power transmission mode combined by the magneto-rheological servo speed regulator-reducer and the normal motor has functions of precise speed reduction, closed-loop control, flexible transmission and power protection.

2. Compared with the traditional mechanical speed reducer, the technological requirement is low, the output precision is high, the product cost is low, the application range is wide, and the cost performance is higher, thereby facilitating marketing.

3. Compared with the traditional mechanical speed reducer, the advantages of the mechatronic product are provided. The speed can be regulated randomly, the universality of the product can be improved, the application range can be expanded, and the usage period of the product can be prolonged.

4. The features of starting, braking and overloading protection are provided by adopting a non-contact clutch driver, and the control circuit of the power source is simplified, so that the composite cost on the electric control is effectively reduced.

5. Refined and integrated management can be performed for the power transmission process, traditional transmission control accessories can be simplified or replaced, the enterprise production cost can be reduced, and the social production efficiency can be increased.

6. The design idea of the power transmission control technology is innovated to play an actively advancing role in promoting the power transmission and controlling the technology industry.

BRIEF DESCRIPTION OF THE DRAWINGS

In FIG. 3: 1. power output shaft 2. planetary gear 3. eccentric shaft 4. left speed reduction main shaft 5. pin gear housing 6. cycloidal pin 7. main bearing 8. right speed reduction main shaft 9. signal control line 10. base housing 11. clutch end plate 12. coil iron core 13. excitation coil 14. input shaft bracket 15. input bearing 16. power input shaft 17. input shaft oil seal 18. magneto-rheological fluid 19. transmission clutch disc 20. clutch cavity 21. transmission oil seal 22. clutch oil seal 23. encoder 24. transmission bearing 25. cycloidal gear bearing 26. cycloidal gear 27. speed reduction main shaft oil seal 28. eccentric bearing 29. transmission main shaft

In FIG. 2: a 8-bit digital tube at the upper row shows the parameters of the function menu, a 7-bit digital tube at the lower row shows the set function menu, a diode indicator light shows the operation function and its meaning is shown by the words therebelow, and all operation functions can be realized by 5 square keys.

Figure 1:
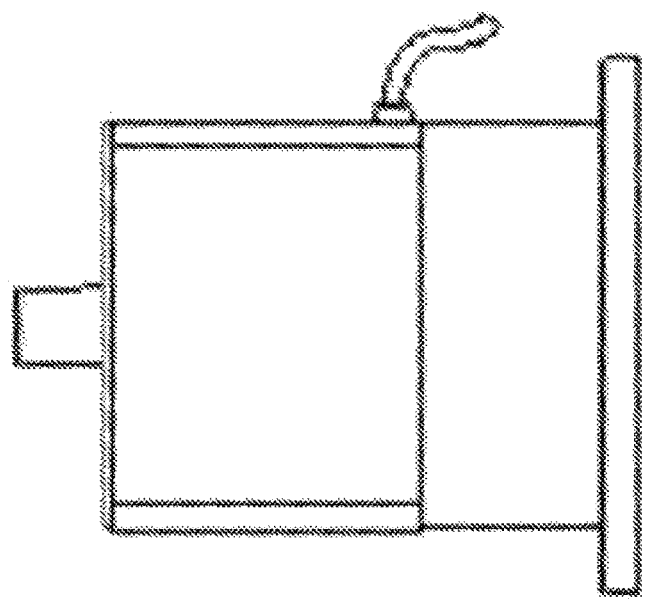
FIG. 1 is a front view of a magneto-rheological servo speed regulator-reducer.
Figure 2:
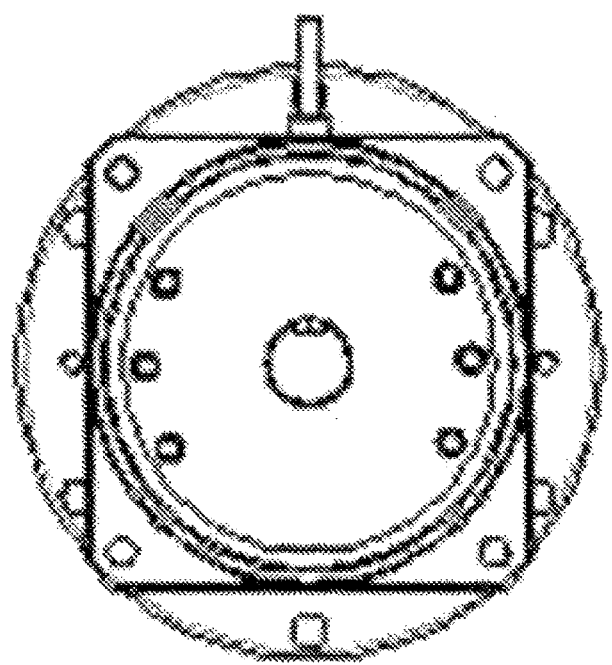
FIG. 2 is a left view of a magneto-rheological servo speed regulator-reducer.
Figure 3:
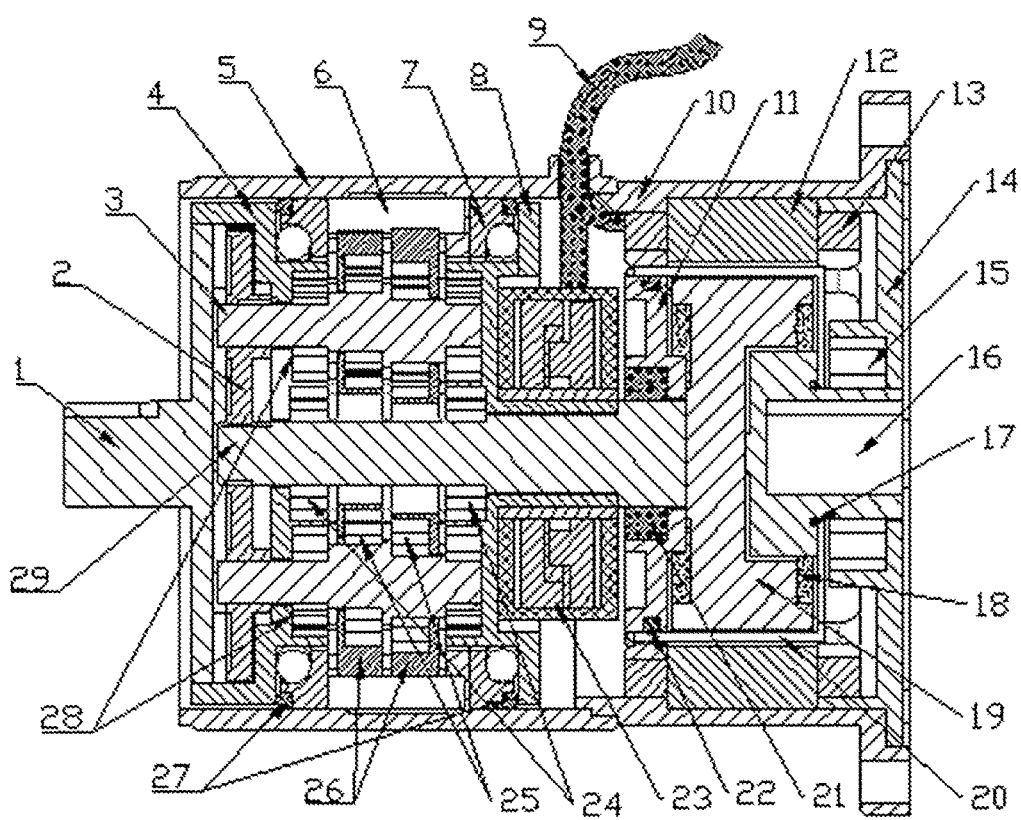
FIG. 3 is a positive sectional view of a magneto-rheological servo speed regulator-reducer.
Figure 5:
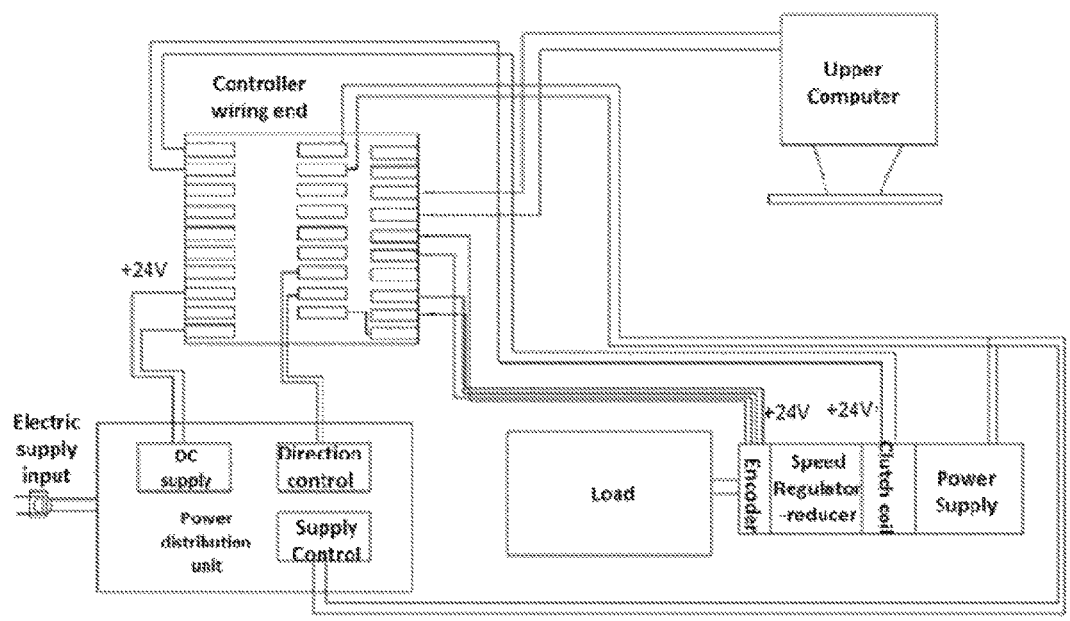
FIG. 5 is a system wiring drawing of the magneto-rheological servo speed regulator-reducer.
Figure 6:
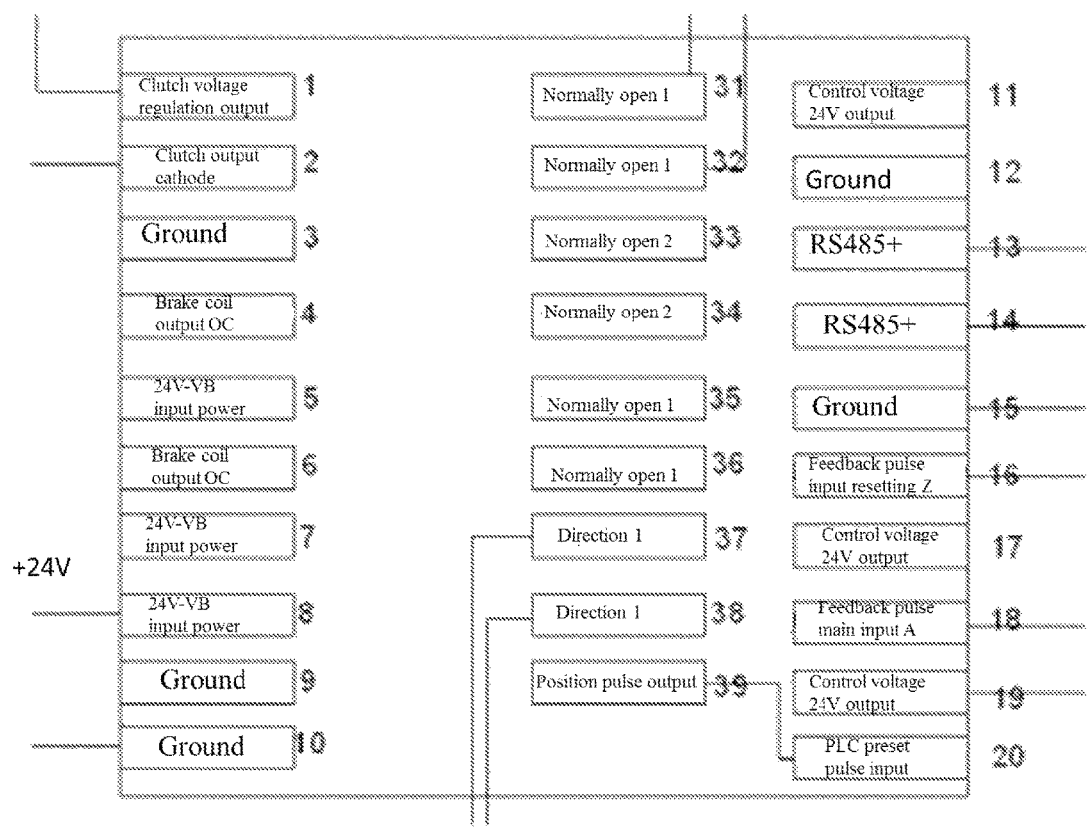

Various wiring end ports in FIG. 5 are respectively as follows: 1. clutch voltage regulation output 2. clutch output cathode 3. ground 4. brake coil output OC 5. 24V-VB input power 8. 24V-VB input power 9. ground 10. ground 11. control voltage 24V output 12. ground 13. RS485+ 14. RS485− 15. ground 16. feedback pulse input resetting 17. control voltage 24V output 18. feedback pulse main input A 19. control voltage 24V output 20. PLC preset pulse input 31. normally open 1A 32. normally open 1B 33. normally open 2A 34. normally open 2B 35 normally closed 1A 36. normally closed 1B 37. direction 1A 38. direction 1B 39. position pulse output;

FIG. 6 is a partial enlarged drawing of the wiring end of the system wiring diagram;

FIG. 3 is pointed as the abstract drawing of the present invention.

DETAILED DESCRIPTION OF THE PREFERRED EMBODIMENTS

The invention will be further described with reference to the drawings. It is very clear for the skilled in the art about the structure and theory of the device. It should be noted that the specific embodiments described herein are only used for expanding the present invention, but not for limiting the present invention.

As shown in FIG. 1 to FIG. 5, a magneto-rheological servo speed regulator-reducer includes a power output shaft, a planetary gear, an eccentric shaft, a left speed reduction main shaft, a pin gear housing, a cycloidal pin, a main bearing, a right speed reduction main shaft, a signal control line, a base housing, a clutch end plate, a coil iron core, an excitation coil, an input shaft bracket, an input bearing, a power input shaft, an input shaft oil seal, magneto-rheological fluid, a transmission clutch disc, a clutch cavity, a transmission oil seal, a clutch oil seal, an encoder, a transmission bearing, a cycloidal gear bearing, a cycloidal gear, a speed reduction main shaft oil seal, an eccentric bearing and a transmission main shaft, wherein both sides of the main bearing are connected with the left speed reduction main shaft and the right speed reduction main shaft, the transmission main shaft is inserted into a right speed reduction main shaft hole, the transmission bearing is installed on the main bearing to form a transmission shaft component, one end at the left side of the transmission main shaft is connected with the planetary gear, the planetary gear is connected with the eccentric shaft to form a planetary speed reducer part with the transmission shaft component, the eccentric bearing and the cycloidal gear bearing are arranged on the eccentric shaft, the cycloidal gear is arranged on the cycloidal gear bearing, the outside of the cycloidal gear is provided with the cycloidal pin, the cycloidal pin, the main bearing, the left speed reduction main shaft, the right speed reduction main shaft, the eccentric shaft, the cycloidal gear bearing, the cycloidal gear and the eccentric bearing constitute a cycloidal pin gear speed reducer part, the power output shaft is installed on the left speed reduction main shaft to constitute a double speed reduction mechanism with the cycloidal pin gear speed reducer part and the planetary speed reducer part, the encoder is sheathed on the right speed reduction main shaft and accessed into the signal control line to form a signal source component, the transmission main shaft is connected with the power input shaft via a magneto-rheological clutch transmission mechanism, the left side of the transmission clutch disc is provided with the transmission main shaft, the right side of the transmission clutch disc is provided with the power input shaft, the transmission clutch disc is arranged in the clutch cavity, the outside of the clutch cavity is provided with the coil iron core, the coil iron core is twined with excitation coil, and the magneto-rheological fluid is provided in the clutch cavity.

Embodiment 1

As shown in FIG. 3, an assembly method of the magneto-rheological servo speed regulator-reducer includes the specific steps as follows.

a. Manufactured parts and magneto-rheological fluid material are prepared according to FIG. 3.

b. The eccentric shaft, the cycloidal gear bearing, the cycloidal gear and the eccentric bearing are installed to form an eccentric shaft component.

c. The pin gear housing, the cycloidal pin, the main bearing, the speed reduction main shaft oil seal, the left speed reduction main shaft, the right speed reduction main shaft and the eccentric shaft component are installed to constitute the cycloidal pin gear speed reducer part.

d. The transmission main shaft is inserted into the right speed reduction main shaft, and the transmission bearing is positioned and installed to form the transmission shaft component.

e. The planetary gear is installed on the eccentric shaft to form the planetary speed reducer part with the transmission shaft component.

f. The power output shaft is installed on the left speed reducer main shaft to constitute a double speed reduction mechanism with the cycloidal pin gear speed reducer part and the planetary speed reducer part.

g. The encoder is sheathed on the right speed reduction main shaft, and accessed to the signal control line to constitute the signal source component.

h. The clutch end plate, the input bearing, the power input shaft, the input shaft oil seal and the transmission are installed.

i. The clutch disc, the clutch cavity, the transmission oil seal and the clutch oil seal are used to constitute a clutch component.

j. The magneto-rheological fluid is injected into the clutch component cavity to constitute a magneto-rheological clutch part.

k. The excitation coil is accessed into the signal control line and installing in the pin gear housing with the coil iron coil to constitute the electromagnetic control component.

l. The input shaft bracket is sheathed on the input bearing and the base housing to constitute a clutch speed regulation mechanism.

m. The mechanisms, parts and components are installed to complete the assembly of the speed regulator-reducer.

n. The signal control line is connected to the servo controller to complete the final assembly of the magneto-rheological servo speed regulator-reducer.

Embodiment 2

Figure 4:
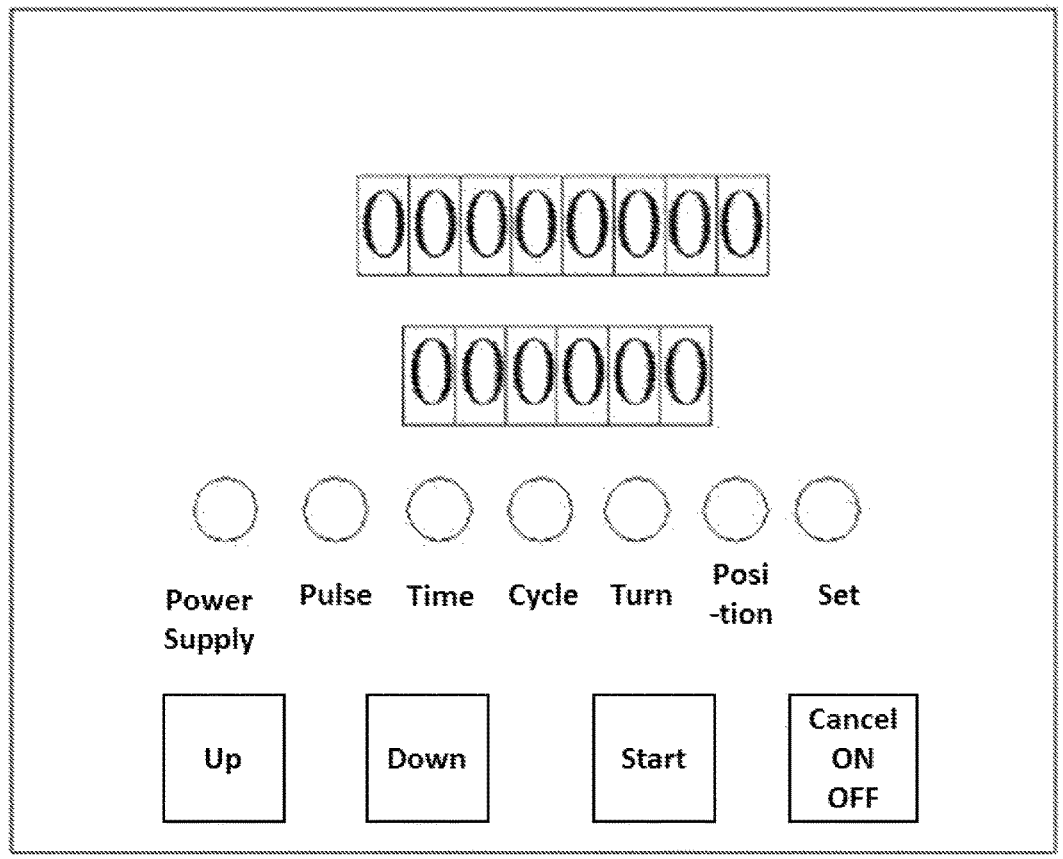
FIG. 4 is a drawing of a servo controller panel of the magneto-rheological servo speed regulator-reducer.

FIG. 4 is the drawing of the servo controller panel in the present invention. The operation method of the servo controller panel is as follows:

a. switching on the power;
b. pressing a key of "on-off" to start, turning on the digital tube;
c. pressing an "up" key for a long time to enter into the function setting state;
d. setting a menu code number, and pressing an "ok" key;
e. setting operating parameters, and pressing an "ok" key;
f. pressing the "ok" key to start or exit the procedure task;
g. automatically executing and completing the running command of the design procedure;
h. pressing the "ok" key in a stop or standby state;
i. press the "on-off" key to shut down; and
j. switching off the power.

The magneto-rheological servo speed regulator-reducer is controlled according to a panel operation method which includes the following steps of: switching on the power, enabling an electric motor and the servo controller to enter into a standby state, setting up running mode, time, pulse number, cycle number and other parameters on a controller panel, starting a power motor by the servo controller to run, wherein a clutch coil of the speed reducer is still in a power-losing state, starting a servo control system procedure, driving the controller to output current to the clutch coil, enabling the magneto-rheological fluid to change phase, enabling the clutch disc to engage with power, driving a speed reducer output shaft to run, setting up or regulating the value of the clutch coil current on the controller panel, regulating the speed by the speed reducer, running the output shaft to enable the encoder to produce a feedback pulse signal, starting pulse counting from zero by the system procedure, controlling the clutch coil for power losing by the system procedure when obtaining that the position pulse number is equal to the feedback pulse number of a transducer by comparing circuits, stopping the speed reducer output shaft, driving a switch contact of the controller circuit to reset, enabling the electric motor to lose power and stop running, commanding the servo controller and the motor to return to the initial standby state by the control procedure according to the set time, switching off a circuit break to cut off the power and the control power source.

The specific control method is as follows:

(1) time control mode switching on an electric main loop, feeding by a direct current power source to, starting the system, closing a normally open contact of a relay, starting a dynamical power to enable the electric motor to run; driving the clutch coil current by the control system according to the running time value set by a single chip and the speed current value of the output shaft, closing the clutch, and enabling the output shaft to output the power; when running to the set time value, enabling the clutch coil to lose power, separating the clutch, resetting the normally open contact of the relay at this moment, cutting off the electric motor driving power to end the power output;

(2) position control mode switching on an electric main loop, feeding by a direct current power source to, starting the system, closing a normally open contact of a relay, starting a dynamical power to enable the electric motor to run; driving the clutch coil current by the control system according to the pulse numerical value set by a single chip and the speed current value of the output shaft, closing the clutch, and enabling the output shaft to output the power; comparing the set pulse number with the feedback pulse number by the control system, when the feedback pulse counting number is equal to the set pulse numerical value, enabling the clutch coil to lose power, separating the clutch, resetting the normally open contact of the relay at this moment, cutting off the electric motor driving power to end the power output;

(3) cycle control mode

At the premise of setting the interval time and period time, the controller continuously recycles a process of a power output working period by, i.e., starting and running——resetting and stopping——time interval——starting and running.

What is claimed is:

1. A magneto-rheological servo speed regulator-reducer comprises a power output shaft, a planetary gear, an eccentric shaft, a left speed reduction main shaft, a pin gear housing, a cycloidal pin, a main bearing, a right speed reduction main shaft, a signal control line, a base housing, a clutch end plate, a coil iron core, an excitation coil, an input shaft bracket, an input bearing, a power input shaft, an input shaft oil seal, magneto-rheological fluid, a transmission clutch disc, a clutch cavity, a transmission oil seal, a clutch oil seal, an encoder, a transmission bearing, a cycloidal gear bearing, a cycloidal gear, a speed reduction main shaft oil seal, an eccentric bearing and a transmission main shaft, wherein both sides of the main bearing are connected with the left speed reduction main shaft and the right speed reduction main shaft, the transmission main shaft is inserted into a right speed reduction main shaft hole, the transmission bearing is installed on the main bearing to form a transmission shaft component, one end at left side of the transmission main shaft is connected with the planetary gear, the planetary gear is connected with the eccentric shaft to form a planetary speed reducer part with the transmission shaft component, the eccentric bearing and the cycloidal gear bearing are arranged on the eccentric shaft, the cycloidal gear is arranged on the cycloidal gear bearing, the outside of the cycloidal gear is provided with the cycloidal pin, the cycloidal pin, the main bearing, the left speed reduction main shaft, the right speed reduction main shaft, the eccentric shaft, the cycloidal gear bearing, the cycloidal gear and the eccentric bearing constitute a cycloidal pin gear speed reducer part, the power output shaft is installed on the left speed reduction main shaft to constitute a double speed reduction mechanism with the cycloidal pin gear speed reducer part and the planetary speed reducer part, the encoder is sheathed on the right speed reduction main shaft and accessed into the signal control line to form a signal source component, the transmission main shaft is connected with the power input shaft via a magneto-rheological clutch transmission mechanism, the left side of the transmission clutch disc is provided with the transmission main shaft, the right side of the transmission clutch disc is provided with the power input shaft, the transmission clutch disc is arranged in the clutch cavity, the outside of the clutch cavity is provided with the coil iron core, the coil iron core is twined with excitation coil, and the magneto-rheological fluid is provided in the clutch cavity.

2. The magneto-rheological servo speed regulator-reducer according to claim 1, wherein the anti-shearing force of the magneto-rheological fluid is generated by the action of a magnetic field of the coil, the strength of the anti-shearing force of the magneto-rheological fluid is controlled by the strength of the magnetic field of the coil; the yield strength and magnetic field strength have a stable corresponding relation, the controllability of the magneto-rheological fluid is applied, a servo system is configured to realize the clutch force regulation and the torque control in order to achieve the transmission control commonly used in a power application occasion, wherein a speed reduction function part uses the double speed reduction mechanism with the planetary gear and a cycloidal pin gear and is connected with a driving shaft of a planetary speed reduction mechanism via the clutch transmission mechanism, the planetary gear of the planetary speed reduction mechanism is connected with the eccentric shaft of the cycloidal pin gear speed reduction mechanism, and the power output shaft can provide a large speed ratio and output torque.

3. The magneto-rheological servo speed regulator-reducer according to claim 2, wherein servo function part in the servo system uses an encoder mechanism and an external controller, the clutch transmission mechanism automatically regulates the current of the excitation coil and the magnetic field strength of the iron core by setting a control system and processing the information of the encoder so as to realize the flexible power clutch of the servo speed regulator-reducer, the precisely random speed regulation and closed-and-open loop control.

4. The magneto-rheological servo speed regulator-reducer according to claim 1, wherein the excitation coil is accessed into the signal control line and the coil iron core to constitute an electromagnetic control component, and the signal control line is connected to a servo controller.

5. The magneto-rheological servo speed regulator-reducer according to claim 1, wherein a transmission way is as follows: transmitting from the power output shaft and the transmission clutch disc of the magneto-rheological clutch part to the transmission main shaft and the planetary gear of the planetary speed reducer part, and then transmitting to the eccentric shaft, the cycloidal gear, the left speed reduction main shaft, the right speed reduction main shaft of the cycloidal pin gear speed reducer part and finally to the power output shaft.

6. The magneto-rheological servo speed regulator-reducer according to claim 1, wherein the encoder is sheathed on the right speed reduction main shaft to gather and feedback the information of the power output shaft and a load end, and the external servo controller drives the excitation coil and the coil iron core to produce a rotating magnetic field.

7. An assembly method of the magneto-rheological servo speed regulator-reducer according to claim 1, comprising the specifically following steps of:
   a. installing the eccentric shaft, the cycloidal gear bearing, the cycloidal gear and the eccentric bearing to form an eccentric shaft component;
   b. installing the pin gear housing, the cycloidal pin, the main bearing, the speed reduction main shaft oil seal, the left speed reduction main shaft, the right speed reduction main shaft and the eccentric shaft component to constitute the cycloidal pin gear speed reducer part;
   c. inserting the transmission main shaft into the right speed reduction main shaft, and positioning and installing the transmission bearing to form the transmission shaft component;
   d. installing the planetary gear on the eccentric shaft to form the planetary speed reducer part with the transmission shaft component;

e. installing the power output shaft on the left speed reducer main shaft to constitute a double speed reduction mechanism with the cycloidal pin gear speed reducer part and the planetary speed reducer part;
f. sheathing the encoder on the right speed reduction main shaft, and accessing the signal control line to constitute the signal source component;
g. installing the clutch end plate, the input bearing, the power input shaft, the input shaft oil seal and the transmission;
h. using the clutch disc, the clutch cavity, the transmission oil seal and the clutch oil seal to constitute a clutch component;
i. injecting the magneto-rheological fluid into the clutch component cavity to constitute a magneto-rheological clutch part;
j. accessing the excitation coil into the signal control line and installing in the pin gear housing with the coil iron coil to constitute the electromagnetic control component;
k. sheathing the input shaft bracket on the input bearing and the base housing to constitute a clutch speed regulation mechanism;
l. installing the mechanisms, parts and components to complete the assembly of the speed regulator-reducer; and
m. connecting the signal control line to the servo controller to complete the final assembly of the magneto-rheological servo speed regulator-reducer.

8. A control method of the magneto-rheological servo speed regulator-reducer according to claim 1, comprising the following steps of: switching on the power, enabling an electric motor and the servo controller to enter into a standby state, setting up running mode, time, pulse number, cycle number and other parameters on a controller panel, starting a power motor by the servo controller to run, wherein a clutch coil of the speed reducer is still in a power-losing state, starting a servo control system procedure, driving the controller to output current to the clutch coil, enabling the magneto-rheological fluid to change phase, enabling the clutch disc to engage with power, driving a speed reducer output shaft to run, setting up or regulating the value of the clutch coil current on the controller panel, regulating the speed by the speed reducer, running the output shaft to enable the encoder to produce a feedback pulse signal, starting pulse counting from zero by the system procedure, controlling the clutch coil for power losing by the system procedure when obtaining that the position pulse number is equal to the feedback pulse number of a transducer by comparing circuits, stopping the speed reducer output shaft, driving a switch contact of the controller circuit to reset, enabling the electric motor to lose power and stop running, commanding the servo controller and the motor to return to the initial standby state by the control procedure according to the set time, switching off a circuit break to cut off the power and the control power source;

the specific control method is as follows:
(1) switching on an electric main loop, feeding by a direct current power source to, starting the system, closing a normally open contact of a relay, starting a dynamical power to enable the electric motor to run; driving the clutch coil current by the control system according to the running time value set by a single chip and the speed current value of the output shaft, closing the clutch, and enabling the output shaft to output the power; when running to the set time value, enabling the clutch coil to lose power, separating the clutch, resetting the normally open contact of the relay at this moment, cutting off the electric motor driving power to end the power output;
(2) switching on an electric main loop, feeding by a direct current power source to, starting the system, closing a normally open contact of a relay, starting a dynamical power to enable the electric motor to run; driving the clutch coil current by the control system according to the pulse numerical value set by a single chip and the speed current value of the output shaft, closing the clutch, and enabling the output shaft to output the power; comparing the set pulse number with the feedback pulse number by the control system, when the feedback pulse counting number is equal to the set pulse numerical value, enabling the clutch coil to lose power, separating the clutch, resetting the normally open contact of the relay at this moment, cutting off the electric motor driving power to end the power output;
(3) at the premise of setting the interval time and period time, the controller continuously recycles a process of a power output working period, or by starting and running——resetting and stopping——time interval——starting and running.

* * * * *